March 8, 1932.   L. COATALEN   1,849,050
FUEL ADMISSION VALVE FOR INTERNAL COMBUSTION ENGINES
Filed May 26, 1930
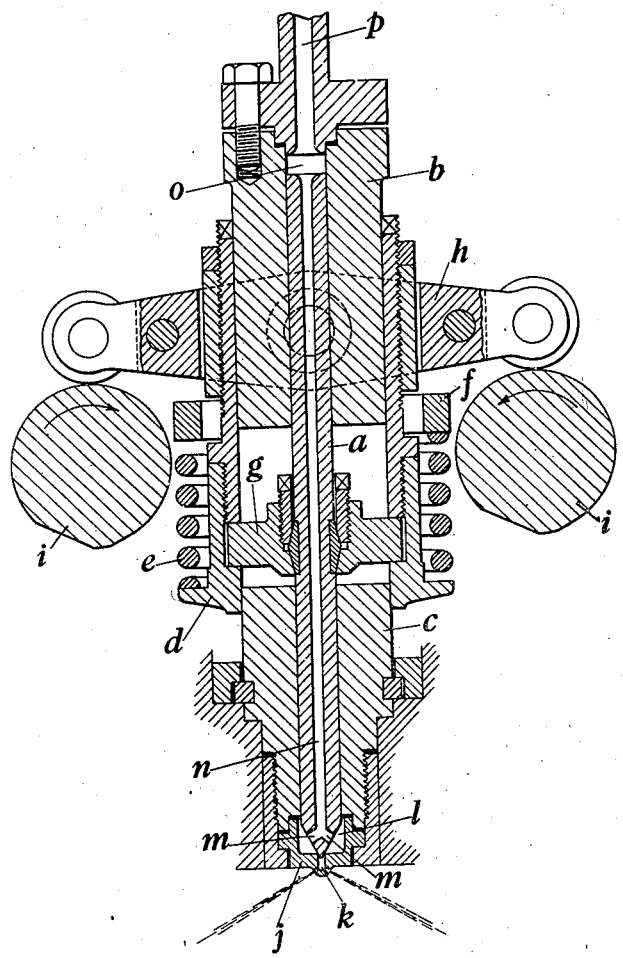

Patented Mar. 8, 1932

1,849,050

UNITED STATES PATENT OFFICE

LOUIS COATALEN, OF WOLVERHAMPTON, ENGLAND

FUEL ADMISSION VALVE FOR INTERNAL COMBUSTION ENGINES

Application filed May 26, 1930, Serial No. 455,750, and in Great Britain February 27, 1930.

This invention relates to fuel admission valves for internal combustion engines of the kind known as compression ignition engines. As is well known, the fuel oil for such engines is usually admitted to the cylinders under high pressures. Hitherto this has necessitated the use of undesirably strong springs for holding the valves on their seatings against the action of the fuel pressure. One of the detrimental results which follows from the use of such springs is the wear of the valve seatings and the consequent imperfect regulation or control of the fuel oil admitted to the cylinders.

The object of the present invention is to enable the use of undesirably strong springs to be obviated in a simple and convenient manner.

The invention comprises a valve in the form of a hollow stem having one end closed and adapted to control the admission aperture to the cylinder, the oil pressure being free to act on the end surfaces of the stem.

The accompanying drawing illustrates a fuel injection valve constructed in accordance with this invention.

In carrying the invention into effect as shown, the fuel inlet valve comprises a hollow cylindrical stem $a$ the upper end of which is enclosed by a fixed body part $b$ and the lower end by a fixed body part $c$. The parts $b$, $c$, are of cylindrical form and over them is arranged a slidable cylindrical sleeve $d$ which is acted on by a controlling spring $e$, the latter abutting at its upper end on a fixed collar $f$ and at its lower end on a flange forming part of the sleeve. The sleeve is connected to the intermediate part of the valve stem by a bridge piece $g$. Reciprocating motion is given to the sleeve and thence to the valve stem in one direction by the spring and in the other direction by a lever $h$ pivoted on the sleeve, the ends of the lever being acted on by cams $i$.

The lower end of the valve stem $a$ is closed and made of conical form for co-operating with a seating $j$ around the small aperture $k$ through which fuel can be admitted to the engine cylinder. The conical end of the stem is enclosed in a small chamber $l$, and is formed with side openings $m$ communicating with the central bore $n$ of the stem. The upper end of the stem is open and is in direct communication with a small space $o$ to which fuel oil is conducted by the supply pipe or passage $p$. It will be apparent that the oil pressure is exerted on both ends of the stem, (neglecting the small area at the closed end which lies within the seating above mentioned) and the areas exposed to the oil can be proportioned so that the stem is wholly or partially balanced.

With such a valve a relatively light spring is sufficient to hold the valve on its seating, and the disadvantages which result directly and indirectly from the use of a heavy spring are obviated.

The invention is not limited to the example above described as the design of the valve may be varied to suit different requirements.

Having thus described my invention what I claim as new and desire to secure by Letters Patent is:

1. In fuel admission valves for compression ignition engines, a hollow valve stem having one end closed and an outlet adjacent the closed end, said valve stem being disposed so that both ends are exposed to fuel oil pressure and being arranged to control the admission aperture to the engine cylinder, substantially as described.

2. In fuel admission valves for compression ignition engines, a valve stem having an oil passage extending from its inlet end to near its delivery end and a closed delivery end arranged to control an aperture through which fuel oil is admitted to the engine seating, a chamber surrounding the delivery end of the valve stem, means whereby fuel oil can pass from the interior of the valve stem to said chamber, and a space located between the fuel oil supply passage and the adjacent end of the valve stem, substantially as described.

3. In fuel admission valves for compression ignition engines, the combination comprising a reciprocatory valve stem having an internal fuel oil passage extending from its inlet end to near its delivery end and a closed delivery end arranged to control an aperture through which the oil is admitted to the engine cylinder, fixed cylindrical parts surrounding the upper and lower ends of the valve stem, an operating sleeve surrounding and slidable on said parts, a spring acting on the sleeve, a lever pivoted on the sleeve, operating cams acting on the lever, a chamber in the fixed part surrounding the lower end of the valve stem and containing the delivery aperture controlled by the lower end of the valve stem, means for leading oil to the said chamber from the passage in the valve stem, and means for conducting oil to the upper end of the valve stem, an oil space being provided at the upper end of the valve stem, substantially as described.

In testimony whereof I have signed my name to this specification.

LOUIS COATALEN.